Feb. 15, 1927.
R. H. HOLT
1,617,484
FISH DRESSING COUNTER
Filed Sept. 9, 1925    2 Sheets-Sheet 1
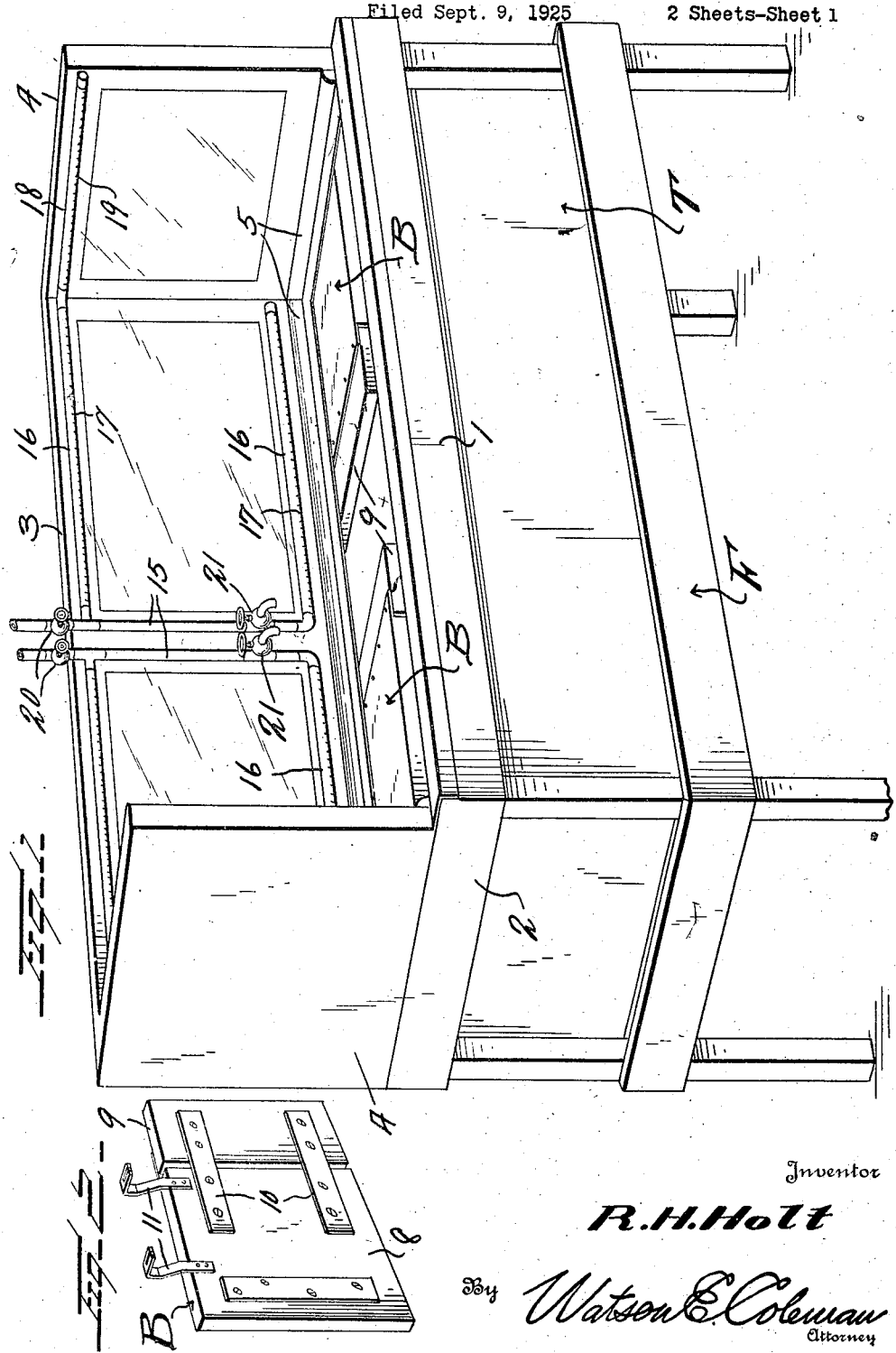
Inventor
R. H. Holt
By Watson E. Coleman
Attorney

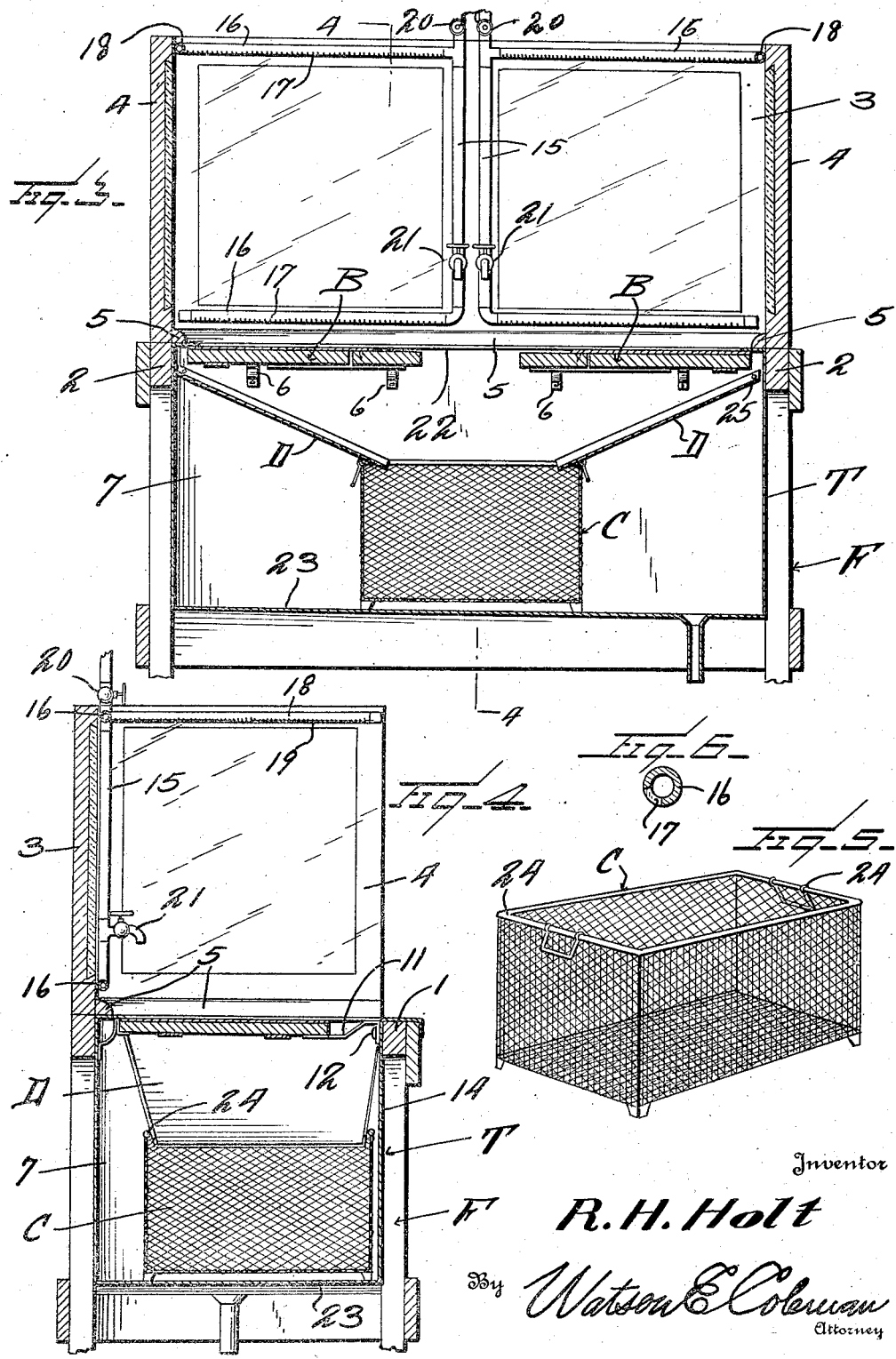

Patented Feb. 15, 1927.

1,617,484

UNITED STATES PATENT OFFICE.

RAYMOND HENRY HOLT, OF DURHAM, NORTH CAROLINA.

FISH-DRESSING COUNTER.

Application filed September 9, 1925. Serial No. 55,337.

This invention relates to fish dressing counters and it is an object of the invention to provide a device of this kind which is highly sanitary and which is provided with means for collecting the offal incident to the cleansing of a fish.

Another object of the invention is to provide a device of this kind comprising a tank in which is arranged an offal collecting receptacle and which tank has supported across its upper open face a dress board having associated therewith a chop block, said board and block being readily removable to permit the receptacle being applied within or removed from the tank.

A further object of the invention is to provide a device of this kind comprising a tank and a dress board and chop block associated therewith together with upstanding back and side walls for the tank and wherein means is provided for directing water over said back and side walls and the dress board and chop block to maintain the same in a highly sanitary condition, said water together with the offal and waste matter carried thereby being received within a removable container arranged within the tank.

Furthermore, it is an object of the invention to provide a device of this kind comprising a tank adapted to receive a removable container together with one or more dress boards and chop blocks disposed over the tank and wherein means are provided for directing a flow of water over each of such dress boards and chop blocks to free the same from all offal or waste matter incident to a working operation, said tank also having arranged therein drain boards leading to the applied receptacle to assure proper delivery thereto of the water and waste matter carried off thereby.

The invention consists in the details of construction and in the combination and arrangement of the several parts of my improved fish dressing counter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a fish dressing counter constructed in accordance with an embodiment of my invention;

Figure 2 is a view in perspective of a dressing board and chop block as herein employed unapplied;

Figure 3 is a longitudinal vertical sectional view taken through the structure illustrated in Figure 1;

Figure 4 is a sectional view taken substantially on the line 4—4 of Figure 3;

Figure 5 is a view in perspective of the collecting receptacle unapplied;

Figure 6 is a detailed sectional view taken through one of the water pipes.

As disclosed in the accompanying drawings, T denotes a tank of requisite dimensions supported by the framing F, said framing including the top side sill 1 and the end sills 2. The rear side sill 1 supports a back wall 3 and the end sills 2 support the side walls 4. These walls 3 and 4 may be constructed of any desired material although it is preferred that the inner faces thereof be glazed. The upper edges of the rear and end walls of the tank T are defined by the inwardly disposed ledges 5 which are adapted to overlie or overlap the adjacent marginal portions of an applied dressing board and chop block B, the rear marginal portion of said board B being engaged with the brackets 6 carried by the rear wall 7 of the tank T. The dressing board and chop block B comprise the dressing board 8 and a separate chop block 9 maintained in desired assembled relation by the metallic straps 10 or the like suitably fixed to the under surfaces thereof. By this means, the chop block 9 when unduly worn may be readily replaced when desired.

The forward marginal portion of the dressing board 8 is provided with outstanding brackets 11 each of which being adapted to be engaged with a headed member 12 or the like extending inwardly from the upper portion of the front wall 14 of the tank T whereby the board B in its entirety is effectively maintained in applied position with the forward edges of the dressing board 8 and the chop block 9 spaced from the front of the front wall 14 of the tank T so that said board will readily drain within the tank.

Extending downwardly immediately adjacent to the rear wall 3 at the central portion thereof is a pair of parallel pipes 15 each leading from a suitable source of water supply and in communication with each of said pipes adjacent the upper and lower margins of the wall 3 and extending to an end wall 4 is a branch pipe 16 having downwardly disposed spraying openings 17. The upper pipe 16 is continued by an extension 18 extending along the upper portion of the side wall 4 and having downwardly discharging spray openings 19. Interposed within each of the pipes 15 is a controlling valve 20 and in communication with the lower portion thereof is a valve control cock 21.

The applied boards B are arranged at the ends of the tank T and at the top thereof leaving a centrally spaced portion 22 below which is positioned a collecting receptacle C supported by the bottom 23 of the tank T and extending inwardly of the opposed ends of the applied boards B. The walls of the collecting receptacle C are formed of screen fabric or the like so that when the receptacle is removed from the tank T, the water will readily drain therefrom and thus leaving within the receptacle C only the offal or waste matter. The opposite ends of the receptacle C are provided with the handles 24 whereby the same may be readily removed or applied.

Arranged at each end portion of the tank T is a drain board D, said board substantially bridging the space between the side walls 7 and 14 and having the upper portion of the drain board pivotally supported, as at 25, for swinging movement in a vertical direction. Each of the drain boards D is of a length to extend within the receptacle C within the tank T and thereby provides effective means to assure the water and offal draining within the tank being first received within the receptacle C.

In practice, when it is desired to cleanse a fish, the fish may first be thoroughly washed by water discharged from a cock 21 and at which time it is preferred that the boards B be removed. After this operation one or both of the boards B are applied in working position and the fish placed upon a dressing board 8 and scaled and then placed upon a chop block 9, to cut the heads and tails and to split the fish open. During these operations, water is flowing through a pipe 15 and its extensions 16 resulting in a spray being thrown upon the inner faces of the walls 3 and 4 and travelling down thereover in the form of a film maintaining such walls thoroughly clean and sanitary and also passing upon the board or boards B and carrying off the offal or waste matter into the receptacle C. It is to be understood that if only one of the boards B is in use, the valve 20 in one of the pipes 15 is closed.

After the fish has been split open, a cock 21 is turned on to wash the fish during the gutting operation. It is to be understood, however, that the cock 21 is to be opened at any time it is desired to further wash the fish direct.

When it is desired to remove the container C, the boards B are taken out and the drain boards either swung upwardly or downwardly sufficient to permit the ready passage of the container.

From the foregoing description it is thought to be obvious that a fish dressing counter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A counter of the class described comprising a tank, upstanding back and side walls carried thereby and disposed above the tank proper, a dressing board and chop block, means for supporting the same over the upper portion of the tank, a pipe leading from a source of water supply extending downwardly of the back wall to a point in close proximity to the tank, pipes in communication with the first named pipe and extending along the upper and lower portions of the back wall, the upper of said second named pipes extending along the upper portion of an end wall, said second named pipes being provided with spray openings.

2. A counter of the class described comprising a tank, upstanding back and side walls carried thereby and disposed above the tank proper, a dressing board and chop block, means for supporting the same over the upper portion of the tank, a pipe leading from a source of water supply extending downwardly of the back wall to a point in close proximity to the tank, pipes in communication with the first named pipe and extending along the upper and lower portions of the back wall, the upper of said second named pipes extending along the upper portion of an end wall, said second named pipes being provided with spray openings, and a cock in communication with the first named pipe.

3. A counter of the class described, including a frame, side and back walls extending upwardly at the ends and one side of the frame, a tank within the frame below said walls, a dressing board and chop block supported within the tank at the upper end thereof and having their inner edges spaced from each other and disposed upon opposite sides of the central portion of the tank, means for directing a flow of water over the walls and the dressing board and chop block, a collecting receptacle within the tank, inclined drain boards extending inwardly from each end of the tank and discharging into the receptacle, and means for movably supporting said drain boards.

In testimony whereof I hereunto affix my signature.

RAYMOND HENRY HOLT.